United States Patent [19]
Cook et al.

[11] Patent Number: 5,819,952
[45] Date of Patent: *Oct. 13, 1998

[54] SIFTING SCREEN

[75] Inventors: Gordon James Cook, Newtonhill; Andrew Hughes, Edinburgh, both of Scotland

[73] Assignee: United Wire Limited, Edinburgh, Scotland

[*] Notice: The term of this patent shall not extend beyond the expiration date of Pat. No. 5,626,234.

[21] Appl. No.: 781,183

[22] Filed: Jan. 9, 1997

Related U.S. Application Data

[62] Division of Ser. No. 513,825, Aug. 29, 1995, Pat. No. 5,626,234.

[51] Int. Cl.$^6$ .................................................... B07B 1/49
[52] U.S. Cl. ........................................... 209/400; 209/401
[58] Field of Search .................................. 209/401, 400, 209/403

[56] References Cited

U.S. PATENT DOCUMENTS

| | | | |
|---|---|---|---|
| 3,716,138 | 2/1973 | Lumsden | 209/401 |
| 4,491,517 | 1/1985 | Janovac | 209/401 |
| 5,221,008 | 6/1993 | Derrick, Jr. et al. | 209/400 X |

FOREIGN PATENT DOCUMENTS

| | | | |
|---|---|---|---|
| 197805 | 5/1978 | Netherlands | 209/401 |
| 2162091 | 1/1986 | United Kingdom | 209/401 |

*Primary Examiner*—D. Glenn Dayoan
*Attorney, Agent, or Firm*—Lee, Mann, Smith, McWilliams, Sweeney & Ohlson

[57] ABSTRACT

A sifting screen is described comprising a rigid frame, a first woven cloth of hard wearing metal wire, stretched thereacross and secured thereto, and a second woven cloth having a coarser mesh than the first cloth and being woven from an elongate material of greater cross-section than the first, also stretched across the frame, and secured thereto, below the first cloth, to support the latter against sagging. In accordance with the invention, at least the wearing surface of the material from which the lower cloth is woven is selected to be significantly less hard wearing than that from which the upper cloth is woven, so that wear due to rubbing and vibration during use, occurs to a greater extent in the lower cloth than in the upper cloth. In one example the upper cloth is woven from stainless steel wire and the lower from phosphor bronze wire. In another example the lower cloth is of wire having a coating of an epoxy based material, or Teflon (TM), or Molybdenum Disulphide. In another example the lower cloth is formed from a plastics material or Kevlar (TM) or carbon fibre. The frame may be formed from glass reinforced gas blown polypropylene reinforced by elongate metal reinforcing elements or rods.

10 Claims, 5 Drawing Sheets

SECTION AT 'A-A'

END VIEW AT 'B'

SIFTING SCREEN

RELATED APPLICATION

This application is a division of U.S. patent application Ser. No. 08/513,825, filed Aug. 29, 1995 now U.S. Pat. No. 5,626,234.

FIELD OF INVENTION

This invention concerns screens for sifting wet particulate materials such as drilling muds as are obtained by drilling operations for gas and/or oil.

BACKGROUND TO THE INVENTION

Typically a sifting screen is composed of a first woven cloth of stainless steel wires stretched within or across a frame and supported by a second woven cloth of stainless steel wires also stretched within or across the frame, the mesh pitch of the second woven cloth being much coarser than that of the first woven cloth.

Since the second woven cloth is intended to prevent the first one from sagging and to assist in de-binding of the top cloth, particularly when loaded with material to be sifted, wire of considerably greater cross-section is normally employed for the second cloth.

The failure of the wires of woven wire sifting screens can be attributed to two factors. The first type of wire failure is commonly referred to as fatigue and appears as breaks in the wires in high flexure regions of the woven cloth. Continued use of a screen after such breaks have occurred rapidly results in adjoining wires breaking at similar points along their length causing cracks in the cloth which widen and elongate until they appear as relatively large elongate openings or slits. These render the screen useless for continued filtration of particulate material since the latter can readily pass through these openings instead of remaining on the upper surface of the fine mesh screen.

Whilst techniques which speed up and facilitate the repair of in-situ screens have their place, the condition of a screen after use typically when filtering water or oil based muds from drilling rigs, is such that a considerable amount of time has to be spent cleaning the screen to allow it to be inspected and damaged regions found and replaced by new inserts. Any downtime of a machine such as this when associated with a process such as sea bed drilling for oil and gas, is not only costly but because sometimes weather conditions and other factors limit the time available for drilling etc, such a failure at a crucial point in time can be critical to the success of the overall operation.

It is therefore an object of the present invention to provide an alternative form of sifting screen construction which will have a longer operational life than that of types hitherto and which under ordinary operating conditions should have a predictable ordinary life span allowing replacement to be performed at set periods of time much in the same way as other components are replaced at regular servicing intervals.

References herein to "wire" are not intended to mean exclusively metal wire but also wire of non metallic materials including plastics, carbon fibre and Kevlar (TM).

SUMMARY OF THE INVENTION

According to one aspect of the present invention, a sifting screen comprises:

(1) a frame
(2) a first woven cloth of hard wearing metal wire, stretched across the frame and secured thereto, and
(3) a second woven cloth having a coarser mesh than the first cloth and being woven from an elongate material of greater cross-section than the first and which is also stretched across the frame and secured thereto below the first cloth, to support the latter against sagging;

The rigidity of the frame is selected so as to restrict overall flexure of the woven cloths so as to reduce fatigue producing movement of the cloths and extend the life of the screen before material fatigue damages either of the cloths.

The tension in the material forming the upper cloth may be different from that in the material forming the lower cloth.

This can be achieved by constructing the screen from heavy gauge steel and/or include structural support members, or from glass reinforced plastics, or resin based materials, with metal reinforcing such as glass reinforced gas blown polypropylene with metal reinforcing elements.

Screen flexure reduction which is closely linked to extending cloth life before material fatigue sets in, tends to introduce screen blinding which reduces the screening area and tends to reduce the speed at which solids can be transported over the screen when in use. This arises from the face that flexure reduction normally requires a greater number of rigid reinforcing members typically of steel, to which the cloths must be firmly secured and, which reduce the area available for filtration.

According therefore to a further feature of the invention, the cross section of the materials from which the cloths are woven and the shape and size of unsupported areas of screen cloths are selected having due regard to the nature of solids materials to be transported over the resulting screen and to the maximum force acting on the screen in a downward sense due to the weight of solids materials heaped thereon during use.

Flexure of a screen mesh when in vibration will be determined by a number of factors but one which can have a significant influence is whether the unsupported lengths of tensioned material are likely to be activated into a resonant mode of vibration or a harmonic or sub-harmonic of their natural resonant frequency by the vibration imparted by the operation of the machine within which the screen is mounted.

According therefore to another feature of the invention, the lengths of elongate material extending across the unsupported regions of the cloths and the tensions in those lengths of material, are selected having regard to the frequency at which the screen is to be vibrated when in use so as to ensure that the natural resonant frequency of the lengths of material making up the warp and weft of each cloth is not capable of being activated into resonance or into any harmonic or sub-harmonic of its resonant frequency. Whilst this will possibly reduce the amplitude excursions of the cloths during vibration and possibly reduce the transportation characteristics of the screen, the likelihood of failure due to material fatigue in the thin smaller cross section material forming the upper cloth will be significantly reduced.

A further step in reducing resonance effects can be achieved by utilising slightly different tensions in the warps and wefts of each cloth so that whatever the natural frequency in one direction, it is different in another. However it is important that the difference in frequency is sufficiently great as not to introduce a low frequency beating effect, which may outweigh the advantage.

BRIEF DESCRIPTION OF THE DRAWINGS

The invention will now be described with reference to the accompanying drawings in which.

DESCRIPTION OF THE PREFERRED EMBODIMENTS

Figure 1:
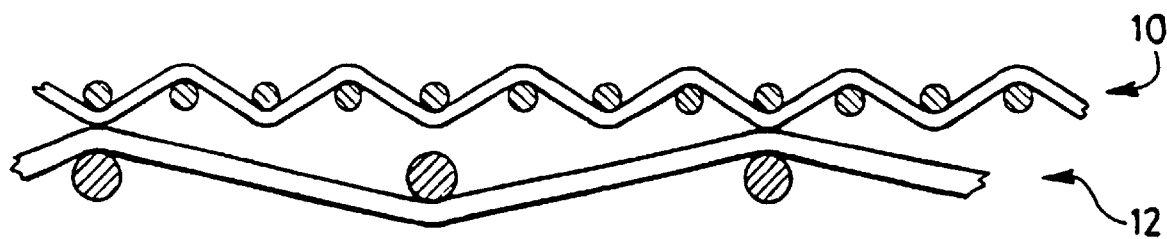
FIG. 1 illustrates to an enlarged scale and partly in cross section the warp and weft wires of two woven mesh cloths of a sifting screen embodying the invention.
Figure 2:
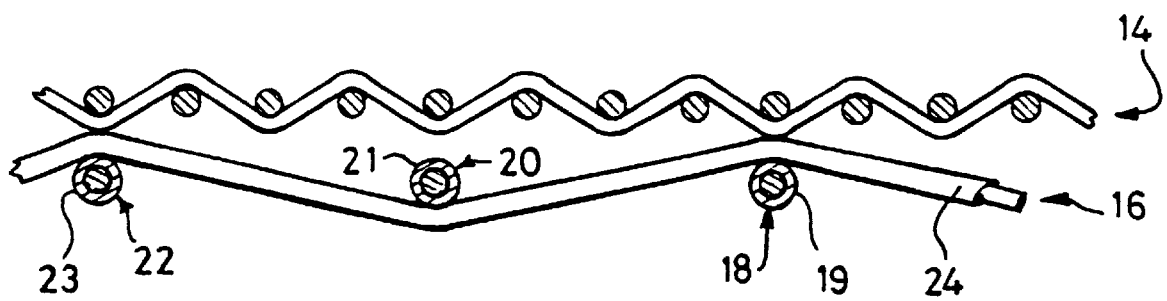
FIG. 2 illustrates the similar wires of another embodiment of the invention.

FIGS. 1 and 2 show different cloth constructions.

In FIG. 1 the upper cloth 10 is formed from woven stainless steel wire in the range 0.19 mm to 0.036 mm diameter and 60–325 mesh, (ie number of strands per inch) while the lower cloth 12 is formed from woven phosphor bronze wire in the range 0.45 mm to 0.19 mm diameter and 20–40 mesh.

In FIG. 2 the upper cloth 14 is formed in a similar manner to cloth 10 in FIG. 1 but the lower cloth is woven from stainless steel wire having a nominal diameter in the range 0.20 to 0.45 mm diameter and typically 30 mesh, and is coated with an epoxy based material, or Molybdenum Disulphide, or Teflon (Registered Trade Mark), to a thickness in the range 5 to 50 microns typically 20 to 40 microns. Multiple passes of the wire through a coating process or through a succession of such processes may be necessary to achieve the desired coating thickness.

The wires 18, 20, 22 are shown in cross section to show the outer material coatings 19, 21, 23 (albeit not to scale)

The wire 24 is shown with the coating scraped of one end.

FIGS. 3 to 8 show various views of an improved screen support frame which is formed from gas blown polypropylene with added glass fibre and reinforced with steel rods, each being of the order of 2.5 mm diameter.

Figure 3:
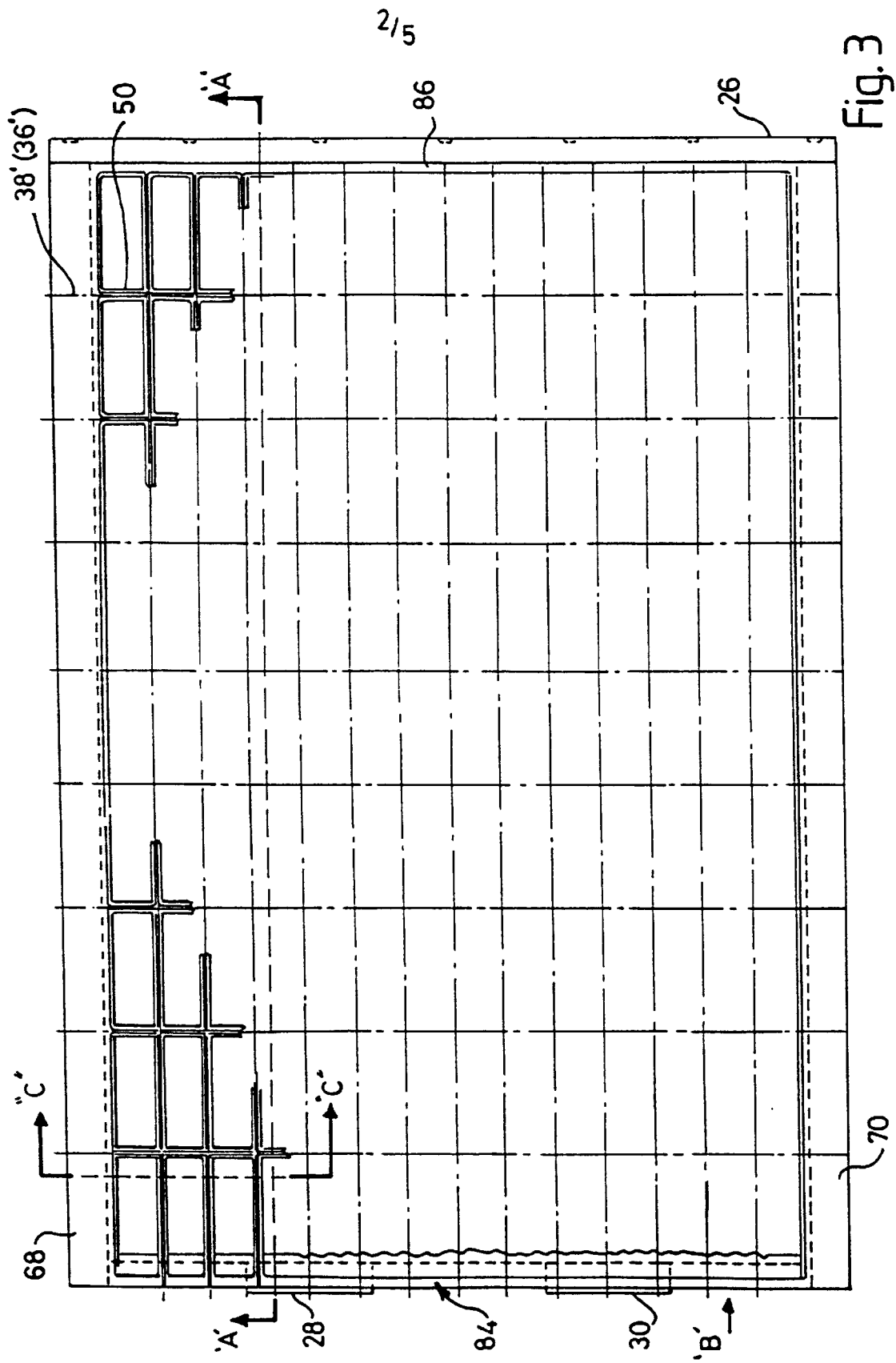
FIG. 3 is a plan view to a reduced scale of a screen support frame to which cloths constructed in accordance with the invention can be secured.
Figure 4:
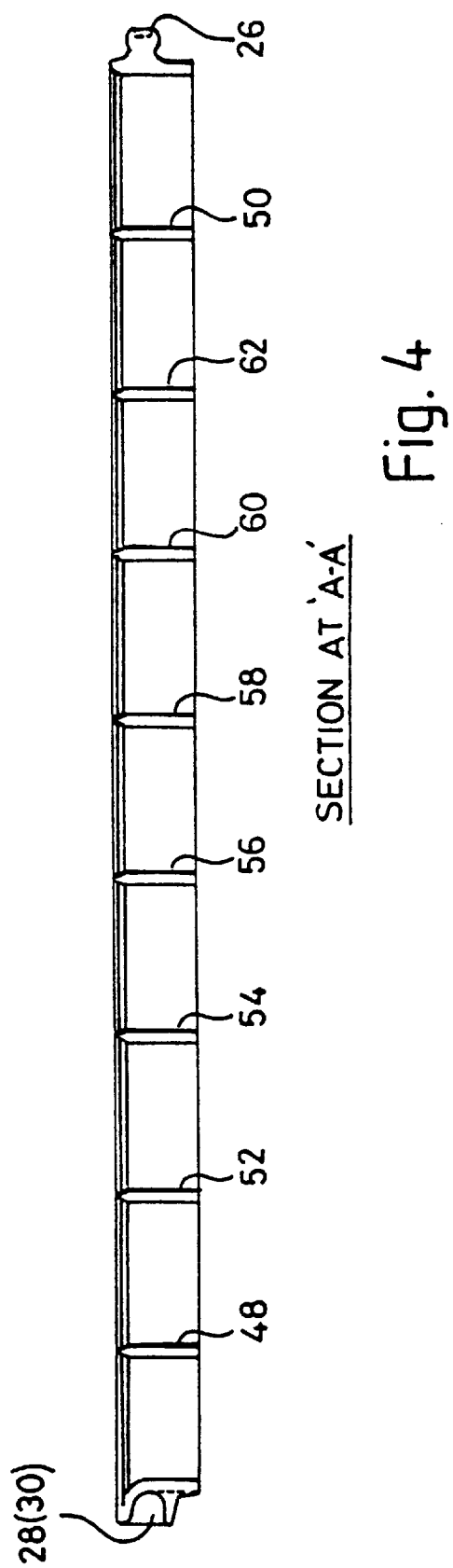
FIG. 4 is a cross section at AA in FIG. 3.
Figure 5:
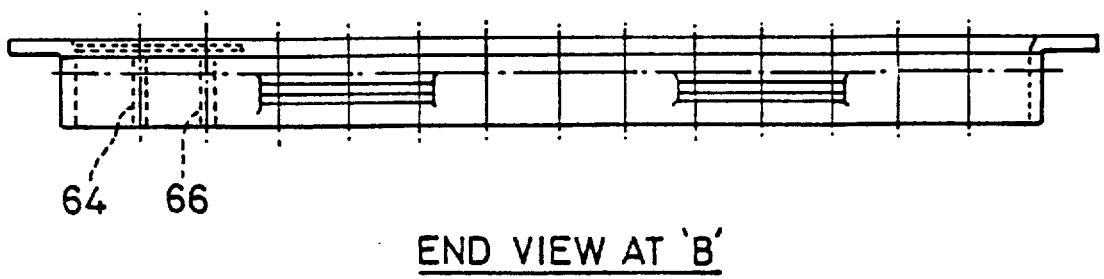
FIG. 5 is an end view at B.

FIG. 3 is a plan view of the support frame and FIGS. 4 and 5 are edge views with the longer edge view shown in cross section along the line "AA" in FIG. 3.

In known manner one such screen frame is adapted to be joined to another in the lengthwise direction and to this end the right hand edge (in FIG. 1) is formed with a male knuckle 26 and the left hand end is formed with two female jaws 28 and 30 (see FIGS. 3 and 4) which permit a knuckle edge 26 to be fitted therein. The join seals the two frame edges together.

Figure 6:
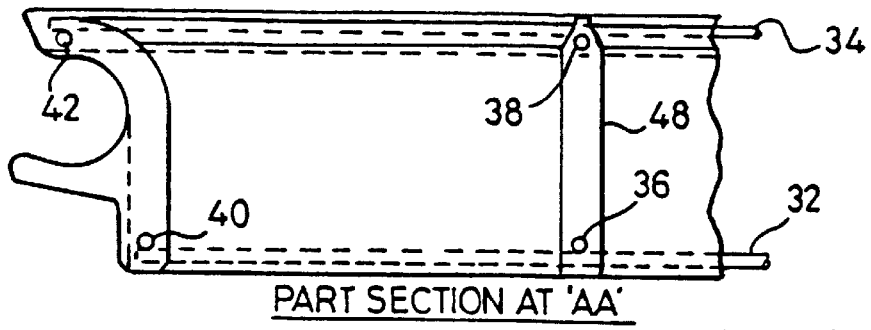
FIG. 6 is a part section at one end on AA; (to an enlarged scale)
Figure 7:
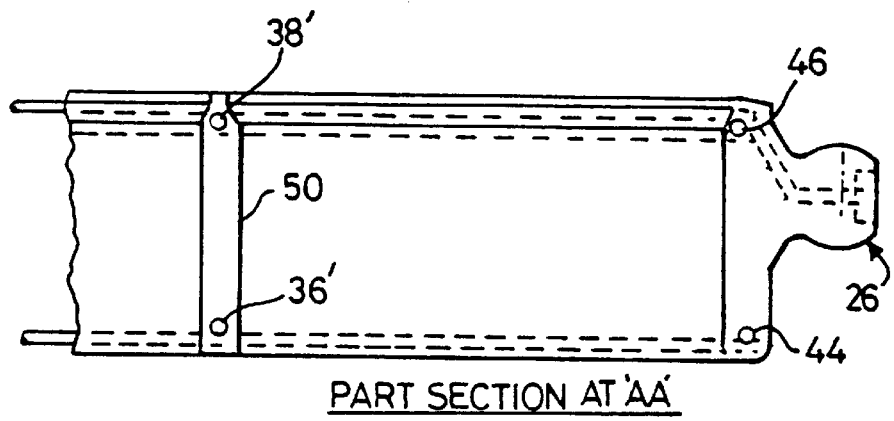
FIG. 7 is a part section at the other end on AA (to an enlarged scale)
Figure 8:
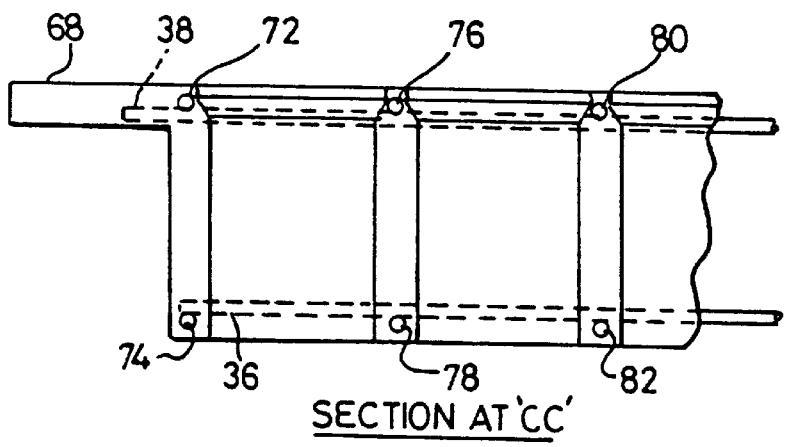
FIG. 8 is a section on CC (to an enlarged scale)

Steel reinforcing rods extend lengthwise and widthwise as shown in FIGS. 6, 7 and 8. These are denoted by reference numerals 32 to 42 in FIG. 6. At their opposite ends, the rods 34 are bent in a downward sense and then in an outward sense, to enter the knuckle edge and reinforce same. Rods 44, 46 extend widthwise above and below the knuckle 26.

Pairs of rods 36, 38 and 36', 38' extend at the top and bottom of widthwise extending reinforcing ribs 48, 50 which are located at regular intervals along the length of the frame, as at 52, 54 etc (in FIG. 4 up to 62).

Similar orthogonal reinforcing ribs 64, 66 etc (see FIG. 5) extend lengthwise at regular intervals across the width of the frame.

The rectilinear matrix of rods and moulded polypropylene reinforcing ribs (both longitudinal and transverse) can be seen in the top left and right hand corners of the plan view of the frame shown in FIG. 3.

FIG. 8 shows how the ends of the top layer of widthwise rods 38 (36) enter the upper flange 68, of which there is a similar one 70 along the other lengthwise edge. The pairs of transverse rods in the section on CC in FIG. 8 are denoted by reference numerals 73, 74; 76,78; and 80, 82.

Two cloths such as shown in FIGS. 1 to 2 are laid across the frame shown in FIG. 3 and after being tensioned are secured in position by a suitable adhesive along the side flanges 68, 70, along the two end flanges 84, 86 and to the upper edges of the matrix of reinforcing ribs.

We claim:

1. A sifting screen comprising a frame; a first woven cloth of hard wearing metal wire, stretched across the frame and secured thereto; and a second woven cloth having a coarser mesh than the first cloth and being woven from an elongate material of greater cross-section than the first and which is also stretched, across the frame, and secured thereto, below the first cloth, to support the latter against sagging; wherein the rigidity of the frame is selected so as to restrict overall flexure of the woven cloths so as to reduce fatigue producing movement of the cloths and extend the life of the screen before material fatigue damages either of the cloths.

2. A sifting screen according to claim 1, wherein the screen frame is constructed from heavy gauge steel.

3. A sifting screen according to claim 1, wherein the frame is formed from glass reinforced gas blown polypropylene and is reinforced by elongate metal reinforcing elements or rods.

4. A sifting screen according to claim 1, wherein the screen includes structural support members.

5. A sifting screen according to claim 1, wherein the cross-section of the materials from which the cloths are woven and the shape and size of unsupported areas of screen cloths are selected having due regard to the nature of solids materials to be transported over the resulting screen and to the maximum force acting on the screen in a downward sense due to the weight of solids materials heaped thereon during use.

6. A sifting screen according to claim 1, wherein the lengths of elongate material extending across the unsupported regions of the cloths and the tensions in those lengths of material are selected having regard to the frequency at which the screen is to be vibrated when in use so as to ensure that the natural resonant frequency of the lengths of material making up the warp and weft of each cloth is not capable of being activated into resonance or any harmonic or subharmonic of its resonant frequency.

7. A sifting screen according to claim 6, wherein different tensions are imparted to the warps and wefts of each cloth so that whatever the natural frequency in one direction, it is different in another.

8. A sifting screen according to claim 1, in which both cloths are tensioned before being secured to the frame.

9. A sifting screen according to claim 8, wherein the tension in the material forming the upper cloth is different from that in the material forming the lower cloth.

10. A sifting screen according to claim 1, when fitted in a vibratory cradle of shale shaker.

* * * * *